United States Patent [19]
Kijowski et al.

[11] Patent Number: 6,093,434
[45] Date of Patent: Jul. 25, 2000

[54] ENHANCED CHOLESTEROL EXTRACTION FROM EGG YOLK

[75] Inventors: Mark Kijowski, Chicago; Stephen P. Lombardo, Palatine, both of Ill.

[73] Assignee: Kraft Foods, Inc., Northfield, Ill.

[21] Appl. No.: 08/097,589

[22] Filed: Jul. 26, 1993

Related U.S. Application Data

[63] Continuation of application No. 07/784,124, Oct. 29, 1991, abandoned, which is a continuation of application No. 07/591,103, Sep. 28, 1990, abandoned.

[51] Int. Cl.⁷ .............................. A23L 1/28; A23L 1/32; A23P 1/00
[52] U.S. Cl. .......................... 426/429; 426/614; 426/519
[58] Field of Search ................... 426/422, 424, 426/425, 429, 431, 614, 519, 520

[56] References Cited

U.S. PATENT DOCUMENTS

| | | | |
|---|---|---|---|
| 3,563,765 | 2/1971 | Melnick | 99/113 |
| 3,594,183 | 7/1971 | Melnick et al. | 99/94 |
| 3,717,474 | 2/1973 | Fioriti et al. | 99/113 |
| 3,881,034 | 4/1975 | Levin | 426/541 |
| 4,103,040 | 7/1978 | Fioriti et al. | 426/614 |
| 4,104,286 | 8/1978 | Fallis et al. | 260/397.25 |
| 4,234,619 | 11/1980 | Yano et al. | 426/614 |
| 4,296,134 | 10/1981 | Boldt | 426/250 |
| 4,333,959 | 6/1982 | Bracco et al. | 426/614 |
| 4,393,044 | 7/1983 | Takada et al. | 424/59 |
| 4,804,555 | 2/1989 | Marschner et al. | 426/601 |
| 4,882,193 | 11/1989 | Carrott | 426/614 |
| 4,971,827 | 11/1990 | Huang | 426/614 |
| 5,091,203 | 2/1992 | Conte, Jr. et al. | 426/614 |

FOREIGN PATENT DOCUMENTS

| | | | |
|---|---|---|---|
| 048818 | 4/1982 | European Pat. Off. | 426/614 |
| 63-109757 | 5/1988 | Japan . | |
| 2 238 456 | 5/1991 | United Kingdom . | |

OTHER PUBLICATIONS

Database Abstract WPI Acc. No. 73–57049U/39 for JP 48044458 published Mar. 9, 1973.
Database Abstract WPI Acc. No. 82–56067E/27 for JP 60018375 published Jan. 30, 1985.
Database Abstract WPI Acc. No. 84–228326/37 for JP 59135847 published Aug. 4, 1984.

*Primary Examiner*—Anthony J. Weier
*Attorney, Agent, or Firm*—Fitch, Even, Tabin & Flannery

[57] ABSTRACT

A method of removing cholesterol from egg yolk by shearing a mixture of oil:egg yolk:water ratio of about 3:1:0.8 to about 1.5:1:0.4 where the temperature of the mixture during shearing is between about 124° to about 148° F.

15 Claims, 4 Drawing Sheets

ENHANCED CHOLESTEROL EXTRACTION FROM EGG YOLK

This application is a continuation of U.S. patent application Ser. No. 07/784,124, filed Oct. 29, 1991, now abandoned which is a continuation of U.S. patent application Ser. No. 07/591,103 filed Sep. 28, 1990, now abandoned.

BACKGROUND OF THE INVENTION

This invention relates to a method for cholesterol removal in egg and egg yolk products to produce products low in cholesterol and high in polyunsaturated fat content.

Eggs have always been recognized as one of the most nutritious and popular foods. Unfortunately, egg yolk is very high in cholesterol content, comprising approximately 1.4 percent of the egg yolk weight. Furthermore, about one-third of the yolk weight is fat. Fatty acid analysis shows that the fat content of an average yolk is 35.4 percent saturated fat (principally palmitic and stearic acids), 49.1 percent monounsaturated fat (oleic acid), and 15.5 percent polyunsaturated fat (linoleic acid). Thus, the ratio of polyunsaturated fat to saturated fat is less than 1 to 2, an undesirable balance.

Substantial research effort has been directed to removal of cholesterol from egg yolks as well as food products which include these materials as ingredients. A variety of approaches to remove cholesterol from egg yolks have been tried. One approach utilizes microorganisms to enzymatically oxidize and degrade cholesterol [Japanese Patent 60-18375], but this method produces cholesterol oxidation products which may be undesirable. Organic solvents have also been used to extract cholesterol [JP 48/44458, U.S. Pat. Nos. 4,104,286; 3,881,034; 3,563,765; 4,234,619 and Tokarska, et al., *Can. Inst. Food Sci. Tech. J.* 18:256–258 (1985)], but such methods remove a substantial portion of the triglyceride oils, and may involve significant processing steps to remove solvents. These solvents are used to extract the cholesterol from the egg yolk. Even with supercritical carbon dioxide as the solvent, selectivity of cholesterol over triglycerides may be limited [*Prepared Foods*, 157:186 (1988); JP 59/135847]. Edible vegetable oils have also been used to extract cholesterol from egg yolks, as described in U.S. Pat. Nos. 3,717,414; 4,103,040 and 4,333,959. However, such extraction using a vegetable soybean oil to remove the cholesterol from yolk produces a waste stream of spent soybean oil. An economical process to regenerate rather than dispose of this spent oil would accordingly be desirable.

U.S. Pat. No. 4,804,555 discloses a process for the simultaneous deodorization and cholesterol level reduction of fish oils. The fish oil is deaerated, mixed with steam, heated, flash vaporized, thin film-stripped with a countercurrent stream, and cooled. U.S. Pat. No. 2,234,619 discloses a method for cholesterol removal from eggs by dehydrating the eggs, extracting the cholesterol with liquid dimethyl ether under anhydrous conditions and removing the dimethyl ether by treatment under reduced pressure at low temperatures. U.S. Pat. No. 4,104,286 describes the isolation of cholesterol from eggs through extraction with ethanol, saponification in an aqueous ethanolic alkali metal hydroxide and concentration and purification with a hydrocarbon solvent and methanol. U.S. Pat. No. 4,393,044 describes the formation of a steroid ester to be used as an oil phase material or base material for cosmetics or ointments.

Thus, it would be desirable to provide egg products having desirable functional characteristics of egg yolk products (e.g., protein and phospholipids), while reducing the cholesterol level and increasing the polyunsaturated fat to saturated fat ratio. It would further be desirable to do this while retaining the functionality, appearance and taste of natural eggs which would yield good texture upon being cooked, thus avoiding dried egg products and the like.

SUMMARY OF THE INVENTION

It is therefore an object of this invention to produce wet egg yolk and egg products therefrom which are substantially lower in cholesterol than normal egg. It is a further object of the invention to produce wet egg yolk and egg products therefrom which have a polyunsaturated fat to saturated fat ratio of 1 or greater, i.e., the polyunsaturated fat content is equal to or greater than the saturated fat content. In achieving the above objects, it is an overall object of this invention to obtain egg products having the functionality of natural eggs. The present invention relates to methods for removing cholesterol from edible triglyceride fats and oils, including animal fats, marine oils and vegetable oils. More particularly, this invention relates to methods for manufacturing reduced cholesterol fats and oils, such as butterfat, beef tallow, lard and cholesterol-containing vegetable oils such as those used from extraction of cholesterol from cholesterol-containing food products such as egg yolks.

Generally, our invention accomplishes these and other results by combining water-diluted egg yolk with an edible oil, preferably high in polyunsaturated fats, using a high energy, high shear mixer.

During the mixing, the cholesterol is extracted from the yolk into the oil. Simultaneously, if a polyunsaturated fat is used, the polyunsaturated fat content of the yolk is increased, raising the P/S ratio. The yolk is then separated gravitationally from the oil and thus recovered. The yolk is still wet, having its water content intact.

DETAILED DESCRIPTION

Figure 1:
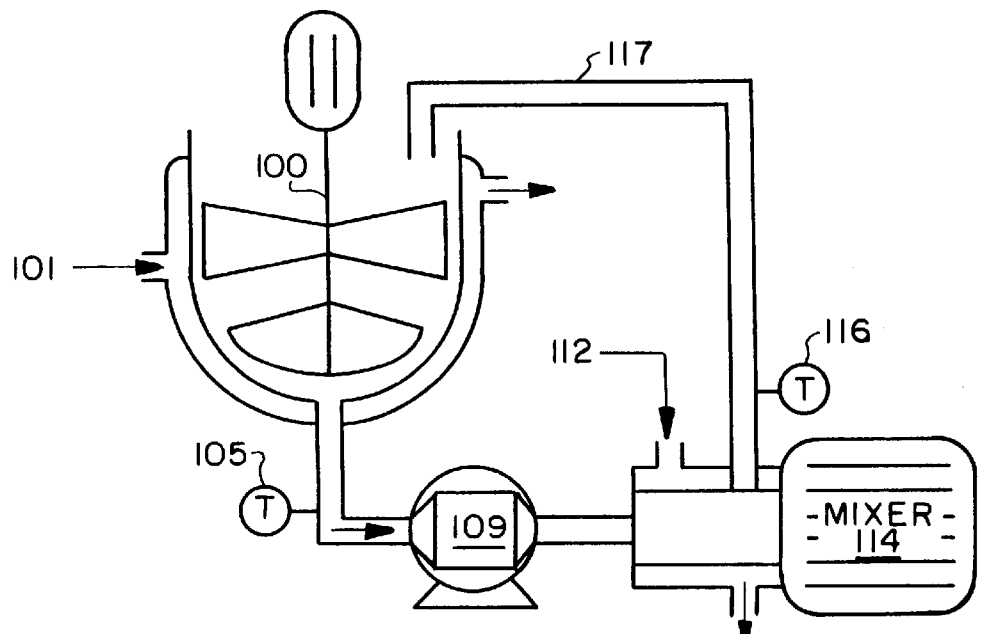
FIG. 1 is a schematic diagram illustrating a specific embodiment of a batch method of shearing the oil:yolk:water mixture.

To remove the cholesterol from egg yolks, the yolks are admixed with water to form a dilute premix. This premix is added to soybean oil to form a mixture which is sheared. The sheared mixture is separated by centrifugation. The resulting product has a reduced cholesterol value and can be used like whole eggs, i.e. in baked goods, puddings, desserts such as ice cream, in pasta, egg dishes, such as omelets, viscous products as mayonnaise and the like. The egg product tends to be a light yellow color, but by adding beta-carotene after processing, the bright yellow color is restored.

The eggs are preferably separated such that only the egg yolks are treated; however, if desired, whole eggs may be treated. The separated yolks may be combined after treatment with the whites and used as one would similarly use whole eggs. The treated yolks, whether combined with the egg whites or not, can be packaged fresh or frozen.

The egg yolks are preferably first separated from the whites and then diluted with cold water to form a premix. The premix is then combined with an oil to form a mixture, preferably a vegetable oil. The mixture optionally can contain from zero to about 14 percent salt based upon the weight percent of the water and egg yolks used. The salt is added optionally to control microbial growth. Preferably, the mixture contains about 12 percent salt.

The ratio of ingredients, oil:yolk:water, is typically about 3:1:0.8 to about 1.5:1:0.4 or any combinations within these ranges, more preferably about 2.8:1:0.4 to about 3:1:0.6. A limiting factor in formulating the ratio of ingredients is that the more water added; the greater the cholesterol removal rate, however if too much water is added, an oil-in-water emulsion is formed. When an oil-in-water emulsion is formed it is extremely difficult if not impossible, to separate the oil and yolk phases.

Although any oil such as cottonseed oil, lard, palm oil, beef tallow, butterfat, coconut oil and the like can be used, oils of particular interest are vegetable oils. Vegetable oils high in polyunsaturated fat are of the most interest. Typical vegetable oils could include the following: safflower oil, corn oil, sunflower oil, soybean oil, canola oil, olive oil, peanut oil and the like. Additionally, a blend of these oils could be used. Most preferably, safflower or soybean oil are used herein. The egg yolks may be salted or unsalted whichever is applicable for the ultimate end use.

Preferably, the premix is added to the vegetable oil after the vegetable oil has been heated to a temperature of about 110° to about 125° F., more preferably about 115° to about 120° F. If the oil has not been preheated, the mixture can be heated to the temperatures as described above.

Typically, any shearing device can be used so long as the cumulative shear value is achieved. Generally, any mixer could be used as a shearing device including, but not limited to high shear mixers-dispersing, in-line mixer homogenizers and the like. The process herein can be accomplished by the apparatus illustrated in FIGS. 1 through 4, but should not be limited to such designs. The temperature during shearing is preferably between about 124° and about 148° F., more preferably about 136° to about 139° F., most preferred is between about 145° and 148° F. The temperature is preferably controlled at the inlet temperature prior to shearing.

After shearing, the oil containing cholesterol is easily separated from the mixture by centrifugation. Any means may be used to separate the oil containing cholesterol from the egg yolks, but typically centrifugation is generally used, or cyclones could be used. After separating the oil from the egg yolk dilution, the cholesterol contained in the oil may be removed by steam stripping and the oil can then be recycled.

Figure 6:
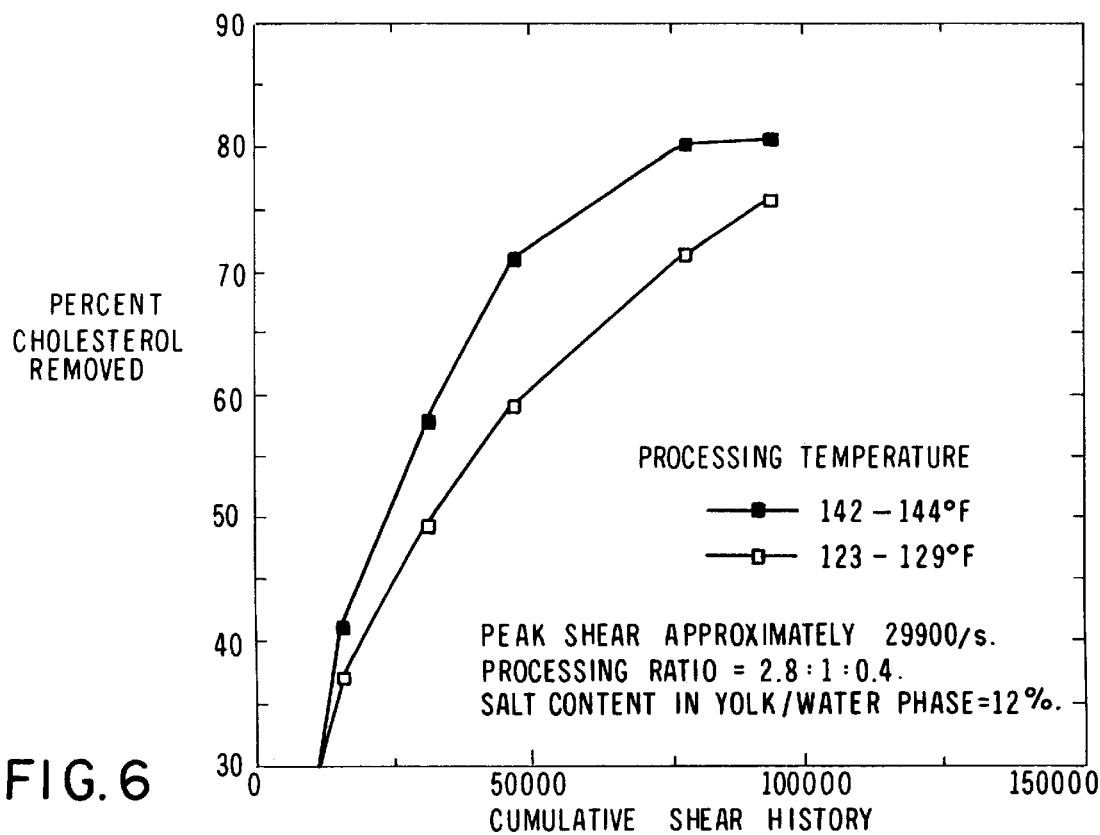
FIG. 6 illustrates the effect of temperature on the cholesterol removal rate as a function of cumulative shear history with a peak shear of approximately 29,900/s, where the dilution ratio was 2.8:1:0.4 (oil:yolk:water).
Figure 7:
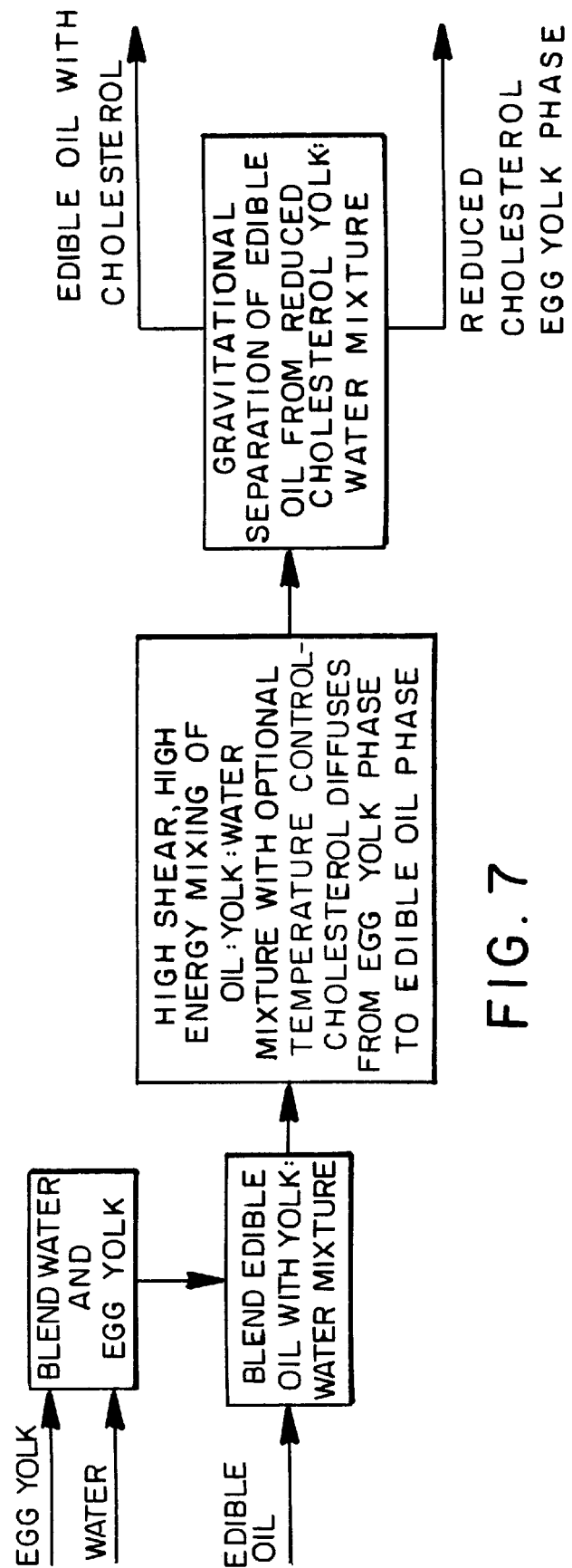
FIG. 7 is a flow diagram of a continuous process for removal of cholesterol from egg yolk.

As can be seen from FIG. 6, the processing time (per lb. of oil:yolk:water mixture) required at a temperature of about 147° to about 148° F. to reach, for example, 65% cholesterol removal is less than 60% of the time required to reach that level of extraction at the lower temperature of between about 124° and about 128° F. At higher temperatures greater rates of cholesterol are extracted; however, at these higher temperatures there is a problem with protein denaturing.

When the oil:yolk:water mixture is processed with a peak shear of 17,900/s, the dilution process has achieved at least 70 percent cholesterol extraction, based on the natural moisture level, when sheared with an estimated cumulative shear history of less than 120,000s/s. This represents an excess of a 30 percent increase in the level of cholesterol extraction achieved without yolk dilution. Processed with a peak shear of 17,900/s, the dilution process has achieved at least 80 percent cholesterol extraction, based on the natural moisture level, when sheared with an estimated cumulative shear history of less than 200,000s/s. This represents an excess of 20 percent increase in the level of cholesterol extraction achieved without yolk dilution. When processed with a peak shear of 29,000/s, the dilution process has achieved at least 80 percent cholesterol extraction, based on the natural moisture level, when sheared with an estimated cumulative shear history of less than 78,000s/s. As the peak shear is increased the same amount of cholesterol can be removed with a lower cumulative shear history than if a lower peak shear value were used.

Generally the oil is pre-warmed in a mixing kettle with a scraped surface agitator 100, 201, 10 and 607 where the kettle is jacketed with hot water 101, 205, 15 and 610. The water and egg yolk are added to the heated oil and mixed. The mixture is transferred via a pump 109, 207, 20 and 618 to a high shear mixer/homogenizer 114, 210, 22 and 630. The temperature of the mixture in the mixer is controlled by a cold water jacket 112, 212 outside the mixer. The mixture is recycled 117, 223, 28 and 660 to the kettle 100, 201, 10, and 607 where another cycle begins. The temperature is monitored by thermocouples 105, 116, 222, 224, 230, 30, 32, 34, 36, 659, 657 and 655. These cycles are repeated until the desired shear history is attained.

Figure 2:
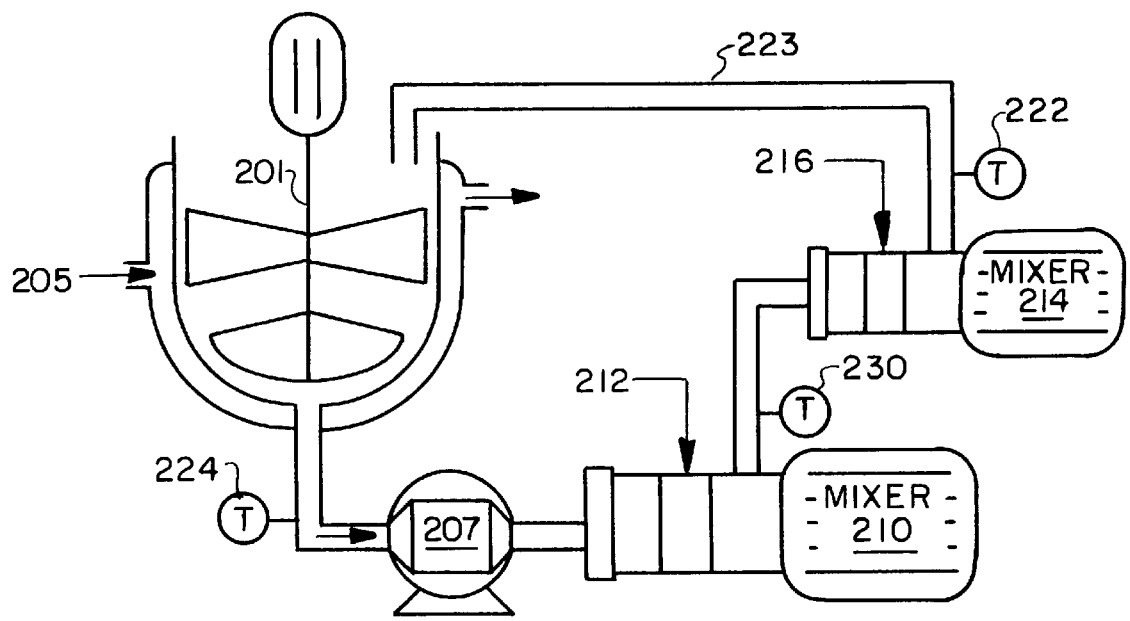
FIG. 2 is a schematic diagram illustrating a specific embodiment of a batch method of shearing the oil:yolk:water mixture, where two shearing mixers are used.
Figure 3:
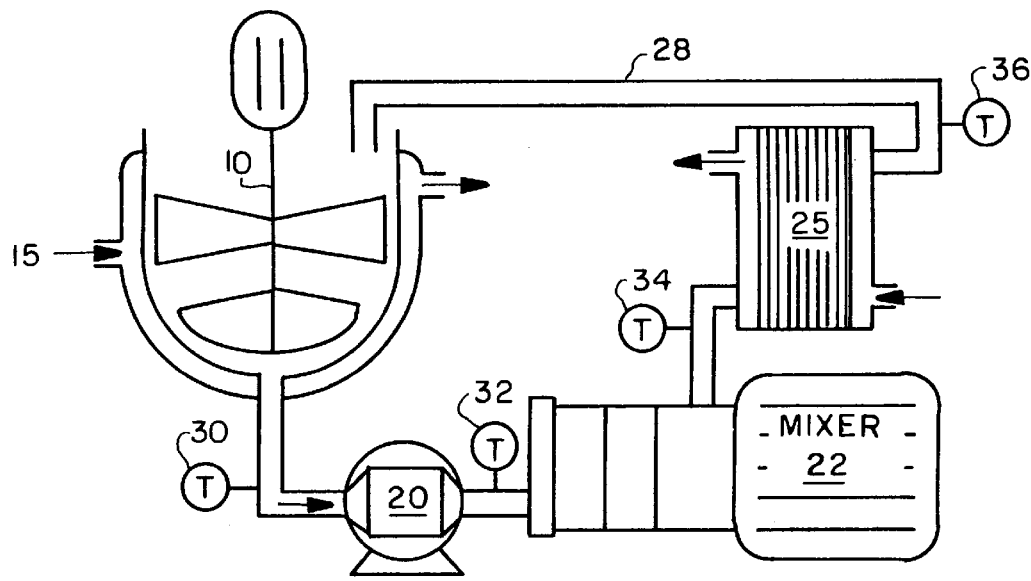
FIG. 3 is a schematic diagram illustrating a specific embodiment of a batch method of shearing the oil:yolk:water mixture, where a heat exchanger is used to control the outlet temperature during shearing.
Figure 4:
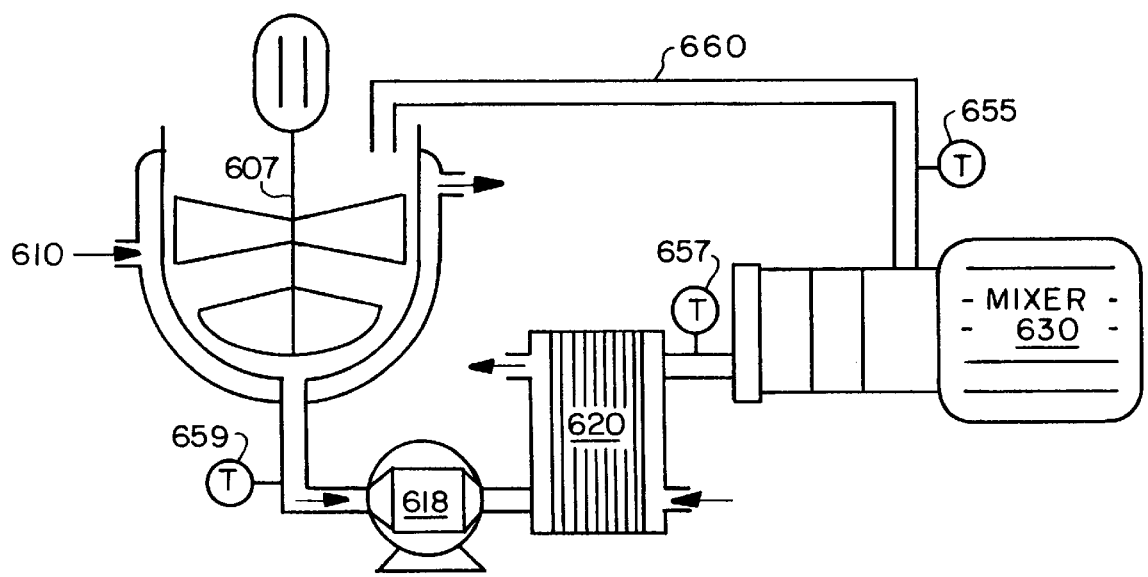
FIG. 4 is a schematic diagram illustrating a specific embodiment of a batch method of shearing the oil:yolk:water mixture, wherein a heat exchange is used to control the inlet temperature during shearing.
Figure 5:
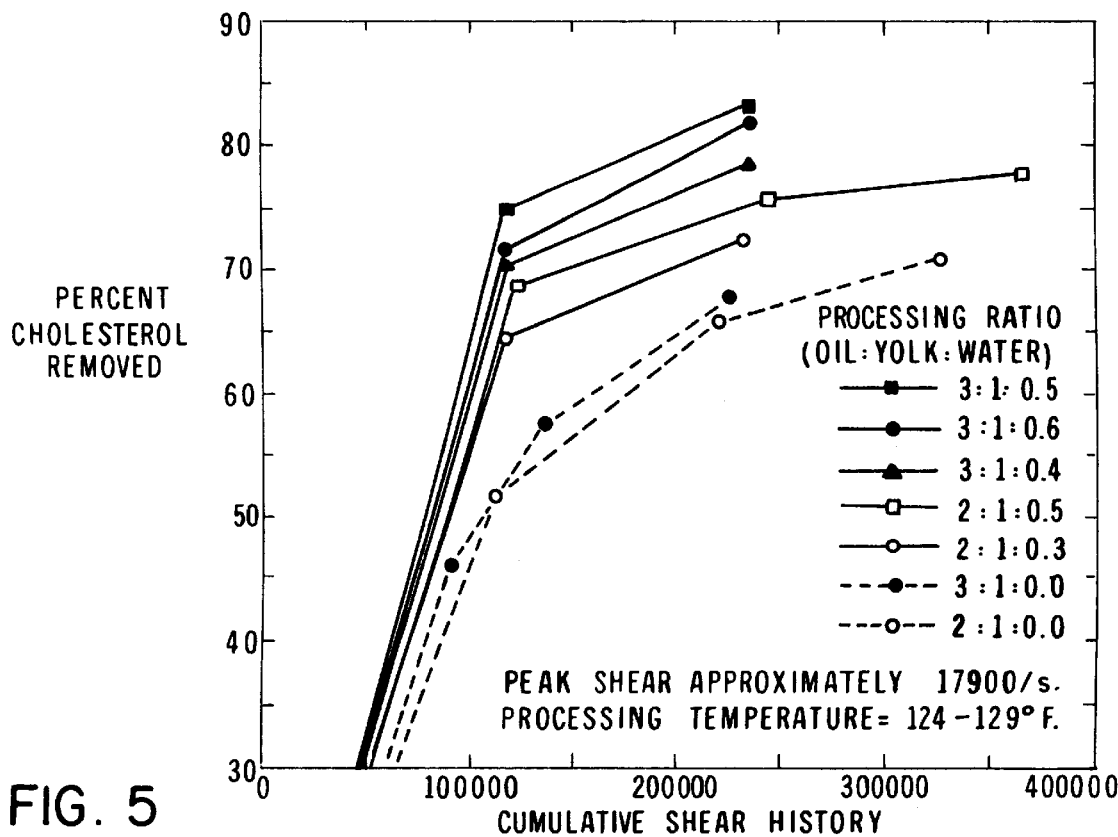
FIG. 5 illustrates the effect of varying the ratio of oil:yolk:water on the cholesterol removal rate as a function of cumulative shear history at a peak shear of approximately 17,900/s.

The process can be further modified, see FIG. 2, where, instead of recycling after shearing in the mixer 210, the mixture is cycled into a second mixer 214 that is cooled with a second cold water jacket 216. Another modification to this process would be to add more mixers or to use a mixer that does not require a pump. Instead of using water jackets to control temperature, see FIG. 3, a heat exchanger 25 at the mixer outlet is used to control the temperature of the mixture after shearing, or, as in FIG. 4, a heat exchanger 620 at the mixer inlet could be used to control the temperature of the mixture prior to shearing. Many variations to these schematic diagrams could be used depending upon the desired needs of the user.

The following examples are not meant to limit or narrow the scope of the invention herein.

EXAMPLES

Example 1

A 3:1:0.5 ratio mixture of soybean oil to salted egg yolk to water was prepared in the kettle 201. Thawed, 10% salted egg yolk of 13.3 lb. was mixed with 6.7 lb. of water and then added to 40.0 lb. of 120° F. soybean oil. The mixture was then circulated at 10 lb/min. through the process system shown in FIG. 2. After the mixture had warmed to 120° F., the mixers were then started. The first mixer, 210, was operated at 3514 RPM and the second mixer, 214, at 3282

RPM. The peak shear was 17,915/s. During processing, the mixture remained at 124°–133° F. Samples of the oil:yolk:water mixture were taken after 5 and after 10 equivalent passes (30 and 60 minutes respectively). After 5 equivalent passes (a cumulative shear history of 11,710 s/s), 75.0% of the cholesterol was extracted from the egg yolk. This represents a 39% increase over the 54% extraction level obtained for salted egg yolk processed under the same conditions but without water dilution. After 10 equivalent passes (a cumulative shear history of 234,200s/s), 83.3% of the cholesterol was extracted from the egg yolk. This represents a 23% increase over the 68% extraction level obtained for salted egg yolk processed under the same conditions, but without water dilution.

Example 2

A 3:1:0.6 ratio mixture of soybean oil to salted egg yolk to water was prepared in kettle 201. Thawed, 10% salted egg yolk of 13.0 lb. was mixed with 7.8 lb. of water and then added to 39.1 lb. of 120° F. soybean oil. The mixture was then circulated at 10 lb/min. through the process system shown in FIG. 2. After the mixture had warmed to 120° F., the mixer units were then started. The first mixer, 210, was operated at 3520 RPM and the second mixer, 214, at 3282 RPM. The peak shear was 17,946/s. During processing, the mixture remained at 122°–130° F. Samples of the oil:yolk:water mixture were taken after 5 and after 10 equivalent passes (30 and 60 minutes respectively). After 5 equivalent passes (a cumulative shear history of 117,200s/s), 71.6% of the cholesterol was extracted from the egg yolk. This represents a 33% increase over the 54% extraction level obtained for salted egg yolk processed under the same conditions, but without water dilution. After 10 equivalent passes (a cumulative shear history of 234,400s/s), 82.0% of the cholesterol was extracted from the egg yolk. This represents a 21% increase over the 68% extraction level obtained for salted egg yolk processed under the same conditions, but without water dilution.

Example 3

A 3:1:0.4 ratio mixture of soybean oil to salted egg yolk to water was prepared in kettle 201. Thawed, 10% salted egg yolk of 13.6 lb. was mixed with 5.5 lb. of water and then added to 40.9 lb. of 120° F. soybean oil. The mixture was then circulated at 10 lb/min. through the process system shown in FIG. 2. After the mixture had warmed to 120° F., the mixer units were then started. The first mixer, 210, was operated at 3500 RPM and the second mixer, 214, at 3282 RPM. The peak shear was 17,844/s. During processing, the mixture remained at 122°–132° F. Samples of the oil:yolk:water mixture were taken after 5 and after 10 equivalent passes (30 and 60 minutes respectively). After 5 equivalent passes (a cumulative shear history of 116,750s/s), 70.4% of the cholesterol was extracted from the egg yolk. This represents a 30% increase over the 54% extraction level obtained for salted egg yolk processed under the same conditions but without water dilution. After 10 equivalent passes (a cumulative shear history of 233,500s/s), 78.7% of the cholesterol was extracted from the egg yolk. This represents a 16% increase over the 68% extraction level obtained for salted egg yolk processed under the same conditions, but without water dilution.

Example 4

A 2:1:0.5 ratio mixture of soybean oil to salted egg yolk to water was prepared in kettle 201. Thawed, 10% salted egg yolk of 35.0 lb. was mixed with 17.5 lb. of water and then added to 70.0 lb. of 120° F. soybean oil. The mixture was then circulated at 10 lb/min. through the process system shown in FIG. 2. After the mixture had warmed to 120° F., the mixer units were then started. The first mixer, 210, was operated at 3498 RPM and the second mixer, 214, at 3146 RPM. The peak shear was 17,830/s. During processing, the mixture remained at 122°–130° F. The process was halted after 6 equivalent passes (73.5 minutes). At this point (a cumulative shear history of 138,240s/s), 68.4% of the cholesterol was extracted from the egg yolk. This represents a 19% increase over the 58% extraction level obtained for salted egg yolk processed under the same conditions, but without water dilution.

The 30.0 lb. egg yolk/water phase was separated from the soybean oil using a semi-batch centrifuge and added to 40 lb. of fresh, 125° F. soybean oil. The mixture was again circulated at 10 lb/min. through the process system shown in FIG. 2. After the mixture had warmed to 122° F., the mixer units were then started. The first mixer, 210, was operated at 3518 RPM and the second mixer, 214, at 3146 RPM. The peak shear was 17,940/s. During processing, the mixture remained at 122°–129° F. The process was operated for an additional 5 equivalent passes (35 minutes). At this point (the cumulative shear history now totaled 253,890s/s), 82.0% of the cholesterol was extracted from the egg yolk.

Example 5

A 3:1:0.4 ratio mixture of soybean oil to salted egg yolk to water was prepared in the kettle 100. Thawed, 10% salted egg yolk of 13.6 lb. was mixed with 5.5 lb. of water and then added to 40.9 lb. of 120° F. soybean oil. The mixture was then circulated at 10 lb/min. through the process system shown in FIG. 1 with the mixer, 104, configured with a course, medium, and fine rotor/stator combination. The peak shear was approximately 80,000/s. After the mixture had warmed to 120° F., the mixer, 104, unit was then started (the mixer, 104, increased the circulation rate to approximately 52 lb/min). During processing, the mixture remained at 120°–129° F. Samples of the oil:yolk:water mixture were taken after 30, 60, and 90 minutes. After 30 minutes, 72.6% of the cholesterol was extracted from the egg yolk. After 60 minutes, 80.7% of the cholesterol was extracted from the egg yolk. After 90 minutes, 84.6% of the cholesterol was extracted from the egg yolk.

Example 6

A 2.8:1:0.4 ratio mixture of soybean oil to salted egg yolk to water was prepared in the kettle 607. Thawed, 10% salted egg yolk of 13.6 lb. was mixed with 5.5 lb. of water and then added to 40.9 lb. of 120° F. soybean oil. The mixture was then circulated at 50 lb/min. through the process system shown in FIG. 4. After the mixture had warmed to 120° F., the mixer, 630, unit was then started. The mixer, 630, was operated at 3510 RPM. The peak shear was 29,900/s. During processing, the mixture in the tank remained at 90°–10° F., the mixture exiting the mixer, 630, at 124°–128° F., and the mixture exiting the heat exchanger 620 at 85°–88° F. Samples of the oil:yolk:water mixture were taken after 10 and after 20 equivalent passes (29.4 and 58.8 minutes respectively). After 10 equivalent passes (a cumulative shear history of 77,900 s/s), 73.3% of the cholesterol was extracted from the egg yolk. After 20 equivalent passes (a cumulative shear history of 155,800s/s), 80.6% of the cholesterol was extracted from the egg yolk.

Example 7

A 2.8:1:0.4 ratio of soybean oil to salted egg yolk to salt water was prepared in the kettle 10 (the additional salt in the water brings the salt content of the egg yolk/water phase to 12% and will more thoroughly control microbial growth). Thawed, 10% salted egg yolk of 30.0 lb. was mixed with 10.0 lb. of 20% salt water and then added to 84.0 lb. of 130° F. soybean oil. The mixture was then circulated at 50 lb/min. through the process system shown in FIG. 3. After the mixture had warmed to 110° F., the mixer, 22, unit was then started. The mixer, 22, was operated at 3510 RPM. The peak shear was 29,900/s. During processing, the mixture in the tank remained at 142°–144° F., the mixture exiting the heat exchanger 25 at 128°–129° F., and the mixture exiting the mixer 22 at 145°–148° F. Samples of the oil:yolk:water mixture were taken after 6 and after 12 equivalent passes (15.1 and 30.2 minutes respectively). After 6 equivalent passes (a cumulative shear history of 46,740s/s), 71.7% of the cholesterol was extracted from the egg yolk. After 12 equivalent passes (a cumulative shear history of 93,480s/s), 80.7% of the cholesterol was extracted from the egg yolk.

Example 8

A 2.8:1:0.4 ratio mixture of soybean oil to unsalted egg yolk to water was prepared in the kettle 10. Fresh, unsalted egg yolk of 5.0 lb. was mixed with 14.0 lb. of water and then added to 98.0 lb. of 130° F. soybean oil. The mixture was then circulated at 50 lb/min. through the process system shown in FIG. 3. After the mixture had warmed to 110° F., the mixer, 22, unit was then started. The mixer, 22, was operated at 3510 RPM. The peak shear was 29,900/s. During processing, the mixture in the tank remained at 136°–137° F., the mixture exiting the heat exchanger 25 at 118°–119° F., and the mixture exiting the mixer, 22, at 137°–138° F. Samples of the oil:yolk:water mixture were taken after 6 and after 12 equivalent passes (17.6 and 35.3 minutes respectively). After 6 equivalent passes (a cumulative shear history of 46,740s/s), 71.3% of the cholesterol was extracted from the egg yolk. This represents a 164% increase over the 27% extraction level obtained for unsalted egg yolk processed under the same conditions, but without water dilution. After 12 equivalent passes (a cumulative shear history of 93,480s/s), 79.3% of the cholesterol was extracted from the egg yolk. This represents a 69% increase over the 47% extraction level obtained for unsalted egg yolk processed under the same conditions, but without water dilution.

What is claimed is:

1. A method of extracting cholesterol from egg yolk where the method comprises: diluting a wet egg yolk having a natural water content with water and mixing the diluted egg yolk with oil to form a mixture containing a ratio of oil to yolk to water between about 3:1:0.8 to about 1.5:1:0.4, shearing the mixture while the mixture is at a temperature between about 124° F. to about 148° F., the shearing effective for not forming an oil-in-water emulsion, and recovering in a water phase an egg yolk reduced in cholesterol by subjecting the sheared mixture to centrifugation so as to separate the mixture into an oil phase and the water phase.

2. The method of claim 1 wherein the mixture is a ratio of about 2.8:1:0.4 to about 3:1:0.6.

3. The method of claim 1 wherein the oil is selected from the group consisting of safflower oil, corn oil, sunflower oil, soybean oil, canola oil, olive oil and peanut oil.

4. The method of claim 2 wherein the oil is soybean oil.

5. The method of claim 1 wherein the mixture is heated to a temperature between about 110° F. to about 125° F. prior to shearing.

6. The method of claim 1 wherein the mixture is sheared to have a cumulative shear history that is not greater than 300,000s/s.

7. The method of claim 6 wherein the peak shear is 29,000/s with a shear history of about 78,000s/s.

8. The method of claim 6 wherein the mixture is sheared to have a peak shear greater than about 17,915/s.

9. The method of claim 6 wherein the amount of cholesterol removed from the egg yolk is greater than 75 weight percent.

10. The method of claim 9 wherein the amount of cholesterol removed from the egg yolk is greater than 80 weight percent.

11. The method of claim 1 wherein the temperature of the mixture when shearing is about 145° F. to about 148° F.

12. The method of claim 1 wherein the mixture contains not more than 14% salt.

13. A method of extracting cholesterol from egg yolk comprising the steps of:
   a) heating an oil to a temperature between about 110° F. to about 125° F. and adding wet egg yolk having a natural level of water which has been diluted with additional water to form a mixture which contains a ratio of oil to egg yolk to water of between about 3:1:0.8 to about 1.5:1:0.4;
   b) shearing the mixture so that the mixture has a cumulative shear history of not greater than 300,000s/s, wherein the temperature of the mixture during shearing is from about 124° F. to about 148° F. and an oil-in-water emulsion is not formed; and
   c) separating the mixture into separate water and oil phases by centrifugation, wherein the cholesterol is contained in the oil phase.

14. The method of claim 13 wherein the temperature of the mixture during shearing is between about 136° F. and 139° F.

15. The method of claim 14 wherein the temperature of the mixture during shearing is between about 145° F. and 148° F.

* * * * *